United States Patent [19]

Jones

[11] Patent Number: 5,440,362

[45] Date of Patent: Aug. 8, 1995

[54] TRANSPARENCY DISPLAY SYSTEM

[76] Inventor: Jeffrey S. Jones, 1502 Enclave Pkwy. #114, Houston, Tex. 77077

[21] Appl. No.: 231,161

[22] Filed: Apr. 22, 1994

[51] Int. Cl.$^6$ .......................................... G03B 23/02
[52] U.S. Cl. .................... 353/103; 353/113; 353/DIG. 1; 353/DIG. 5
[58] Field of Search .............. 353/103, 104, 106, 109, 353/113, 114, 116, 120, DIG. 1, DIG. 5

[56] References Cited

U.S. PATENT DOCUMENTS

| | | | |
|---|---|---|---|
| 3,110,217 | 11/1963 | Millner | 353/DIG. 5 |
| 3,398,636 | 8/1968 | MacLachlan | 353/122 |
| 3,531,193 | 9/1970 | Diehl | 353/DIG. 5 |
| 3,594,082 | 7/1971 | Lonchar | 353/DIG. 5 |
| 4,264,158 | 4/1981 | Lindquist | 353/DIG. 5 |
| 4,707,092 | 11/1987 | Mindell | 353/120 |
| 4,756,616 | 7/1988 | Min et al. | 353/103 |
| 4,942,411 | 7/1990 | Polston | 353/DIG. 5 |
| 5,059,020 | 10/1991 | Géniéis | 353/103 |
| 5,172,145 | 12/1992 | Stephenson | 353/103 |
| 5,198,846 | 3/1993 | Zilber | 353/103 |

Primary Examiner—William A. Cuchlinski, Jr.
Assistant Examiner—William C. Dowling

[57] ABSTRACT

A system for the display of transparencies including a first transparency receiving tray, a second transparency receiving tray, and a staging system connected at one end to the first transparency receiving tray and at the other end to the second transparency receiving tray. This staging system includes a transfer belt extending across a staging area so as to move a transparency across the staging area, a motor drivingly connected to the transfer belt so as to selectively rotate the transfer belt in various directions, and an actuating guide positioned adjacent to the first transparency receiving tray so as to direct the transparency from the first tray to the transfer belt. A controller is connected to the motor so as to actuate the motor for moving a transparency across the staging area in a desired direction. A lift plate is mounted in the receiving trays so as to support a plurality of transparencies thereon. A lift solenoid is connected to the lift plate so as to raise or lower the lift plate relative to an action of the controller. A guide tab is connected to an upper edge of the first transparency receiving tray so as to direct a single transparency from the tray to the transfer belt.

17 Claims, 7 Drawing Sheets

TRANSPARENCY DISPLAY SYSTEM

TECHNICAL FIELD

The present invention relates to apparatus for the sequential display of transparencies by an overhead projector. More particularly, the present invention relates to a system for allowing a stack of transparencies to be displayed in a desired manner, in either a forward or backward direction.

BACKGROUND ART

A popular method of displaying information is by the use of overhead transparencies. Clear plastic sheets are imprinted with information from a variety of sources, such as photocopies, desktop plotters, and hand-drawn images using ink pens. These images are then placed on an overhead protector for display. The overhead projector passes high-intensity light through the transparent images, through a set of optics, and onto a screen.

An overhead projector commonly includes a light box having a horizontal cover glass, and a lens and mirror arrangement positioned above the cover glass for projecting onto a remote viewing screen the image of a transparency positioned on the cover glass and illuminated by a light source located within the box. Usually, the changing from one transparency to the next is performed manually, with each transparency being manually placed in turn onto the light box cover glass for viewing, and then manually removed after viewing. Such procedure is not only tedious and tiresome, but makes it difficult to maintain the transparencies in proper order, particularly if some of the transparencies will be shown multiple times during the same presentation. Moreover, in order to have the correct image orientation during viewing, each transparency must be correspondingly correctly oriented on the viewing plate. This makes handling even more cumbersome, especially if the room is darkened to enhance image contrast. In the past, a variety of patents have issued relating to devices for automatically feeding a stack of transparencies, one at a time. For example, U.S. Pat. No. 5,172,145, issued on Dec. 15, 1992, to S. Stephenson describes a transparency changer arrangement in which transparencies are automatically sequentially fed by pick and retard rollers from a single enclosed cassette-loaded transparency stack. The transparencies are passed under transparent plates to belts and rollers located marginally of a viewing area of the projector. A microprocessor circuit controls the stack of transparencies so as to facilitate the selection by the user.

U.S. Pat. No. 5,059,020, issued on Oct. 22, 1991, to Jean A. Genieis teaches a device for automatically feeding a projector which includes two removable mostly enclosed cassettes, one located directly above the other. Each of these cassettes is fitted with levers carried by shafts actuated by electromagnets. Two transverse shafts above the leading edge of each cassette carry return pulleys over which belts pass for driving the top document from a stack of documents in the cassette.

U.S. Pat. No. 4,942,411, issued on Jul. 17, 1990, to S. A. Polston provides an automatic overlay feed apparatus for an overhead projector. This device includes a scrolling means including a first winding shaft and a second winding shaft for moving an overlay scroll. A plurality of sequentially arranged projectable overlay sheets are moved across the area of the projector. A motor is provided so as to rotate at least one of the winding shafts. A remote controller provides controlled operation of the motor from a remote location.

U.S. Pat. No. 4,707,092, issued on Nov. 17, 1987, to M. I. Mindell provides a transparency transport system that includes a transfer belt made of a base web and a pocket web, fused together to form a series of encapsulating pockets, for the purpose of receiving a sequence of transparencies. A platen is positioned so that the transfer belt can advance across the platen from a fanfold supply stack next to the projector.

U.S. Pat. No. 4,368,964, issued on Jul. 18, 1983, to U. R. Carlson describes a slide projector with an automatic slide changer. Magazines are provided on each side of the optical pathway of the projector so as to support slides therein. A slide frame transport device is provided which consists of two toothed belts provided with external dog members for transporting the slide frames from one slide magazine to the other.

U.S. Pat. No. 3,594,082, issued on Jul. 20, 1971, to T. M. Lonchar teaches a slide changer attachment which includes mating case sections pivotally connected by slidable adjustable arms to the side of an overhead protector. An intermediate panel is mounted on one of the case sections and supports a sliding feed plate adjacent the bottom of the hopper. The feed plate is connected to an endless belt driven by a reversible motor controlled by a circuit including a manually actuated switch, a set of limit switches, and a relay to effect automatic reciprocation of the feed plate.

U.S. Pat. No. 4,756,616, issued on Jul. 12, 1988, to Min et al. describes an image projection system which includes a frame, a source of illumination, a projection lens, a stage mounted to the frame for projecting a transparency thereon for view, and a delivery means for gripping and slidingly moving an unframed transparency along the surface of the stage. A magazine holds a stack of unframed transparencies for insertion into the frame adjacent to the stage. A feed system is provided so as to allow for the movement of transparencies from one of the magazines to the other.

It is an object of the present invention to provide a transparency display system that allows transparencies to be displayed while allowing free movement by the displayer.

It is another object of the present invention to provide a transparency display system that can handle framed or unframed transparencies.

It is another object of the present invention to provide a transparency display system that is adaptable to a wide range of transparencies.

It is a further object of the present invention to provide a transparency display system that improves the time and effectiveness of transparency display, provides greater flexibility for the user of the system, and is very easy to operate.

It is another object of the present invention to provide a system which has open access to transparencies at every point in the system.

It is yet a further object of the present invention to provide a system that can use framed or unframed transparencies and is capable of transferring transparencies in both the portrait and landscape positions.

These and other objects and advantages of the present invention will become apparent from a reading of the attached specification and appended claims.

SUMMARY OF THE INVENTION

The present invention is a system for the display of transparencies which includes a first transparency receiving tray, a second transparency receiving tray, a staging means, and a control means connected thereto. The staging means is connected at one end to the first transparency receiving tray and at the other end to the second transparency receiving tray. This staging means includes a transfer belt extending across the staging area so as to move a transparency across the staging area, a motor drivingly connected to the transfer belt so as to selectively rotate the transfer belt in a desired direction, and an actuating guide means positioned adjacent to the first transparency receiving tray so as to direct a transparency from the first tray to the transfer belt. The control means is connected to the motor so as to actuate the motor for moving a transparency across the staging area in a desired direction.

Both of the first and second transparency receiving trays includes a lift plate positioned therein so as to support a plurality of transparencies, a guide tab connected to an upper edge of the receiving trays adjacent to the staging means, and a lift solenoid connected to a surface of the lift plate. The guide tab serves to direct a single transparency to the transfer belt. The lift solenoid is interconnected to the controller so as to raise or lower the lift plate relative to an action of the controller.

The staging means further includes a feed roller rotatably mounted adjacent the guide tab of the receiving trays. This feed roller is drivingly connected to the motor so as to move a transparency through the guide tab toward the transfer belt. A plurality of transfer rollers underlie a bottom surface of the transfer belt. The motor is a DC motor. The controller is a remote controller that is interconnected to the motor. The controller serves to lower the lift plate of the second transparency receiving tray when a transparency passes toward the second tray. Sensors are mounted adjacent to these trays so as to sense the presence and orientation of a transparency in the staging area. A housing is provided to which the receiving trays can be hingedly and removably connected. This housing has an open display area which allows easy access to transparencies.

The receiving trays are also open and are suitable for receiving portrait and landscape transparencies therein. A guide solenoid is interactive with these transparencies so as to selectively control a movement of the receiving tray relative to a signal of the controller.

DETAILED DESCRIPTION OF THE INVENTION

Figure 1:
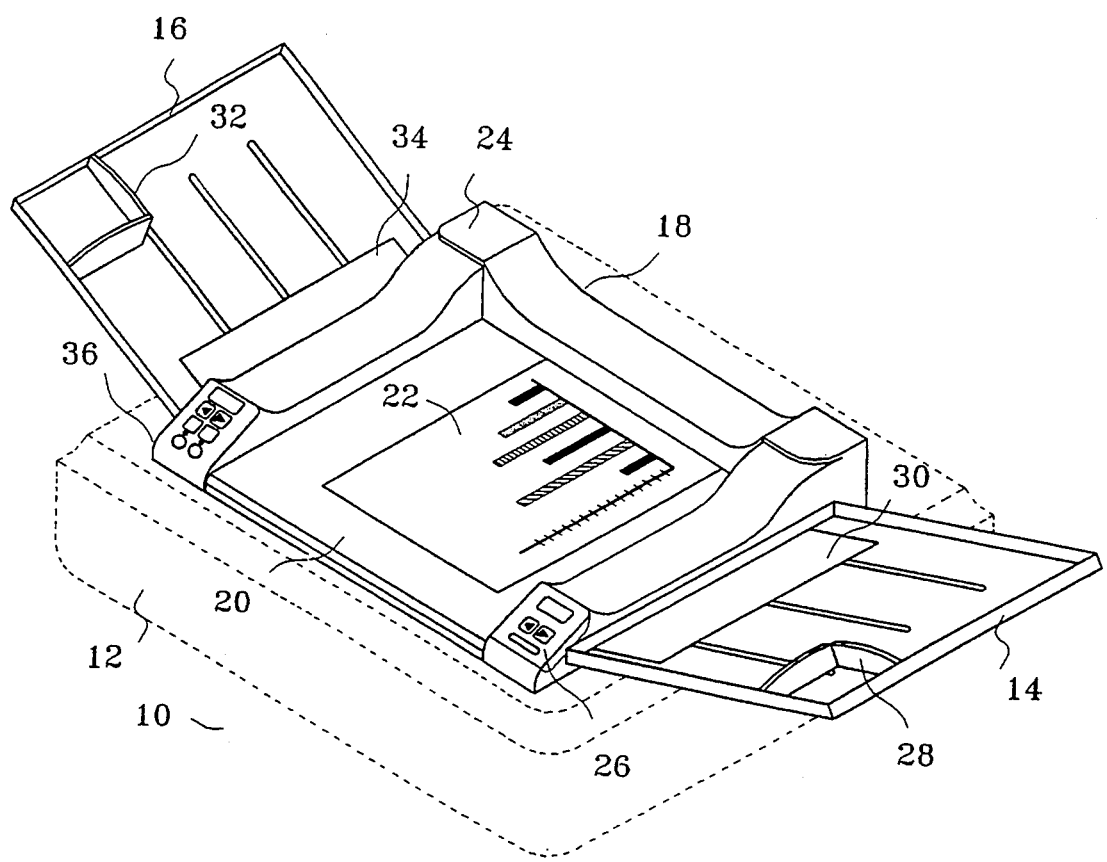
FIG. 1 is a general illustration of a transparency display system within the scope of the present invention.

FIG. 1 shows a transparency display system 10 within the scope of the present invention as placed upon an overhead projector 12. The overhead projector 12 is a conventional overhead projector. The transparency display system 10 is comprised of a first transparency receiving tray 14, a second transparency receiving tray 16, and a staging means 18. The first transparency receiving tray 14 is hingedly and removably connected to one side of the staging means 18. Similarly, the second transparency receiving tray 16 is affixed to the opposite side of the staging means 18. As can be seen, the staging means 18 is positioned over the light-producing area of the overhead projector 12. The staging means 18 includes a central display area 20 formed therein. The central display area 20 can receive a transparency 22 therein. The staging means 18 is made up of a housing 24 of a generally rectangular configuration. The housing 24 contains the mechanisms for the movement of a transparency from one receiving tray to the other receiving tray.

The first transparency receiving tray 14 includes an adjustable guide 28 that can conform to the size of the transparency contained within the area of the receiving tray 14. A lift plate 30 is positioned within the receiving tray 14 so as to support a plurality of transparencies thereon. The receiving tray is insertable into a side of the housing 24 of the staging means 18. The second transparency receiving tray also includes an adjustable guide 32 and another lift plate 34. The configuration of the receiving tray 14 is very similar to the configuration of the receiving tray 16. The receiving tray 16 is inserted into an opening 36 formed on the opposite side of the staging means 18 from the first receiving tray 14. The area of the receiving trays 14 and 16 should be suitable for accepting both landscape and portrait transparencies.

Figure 2:
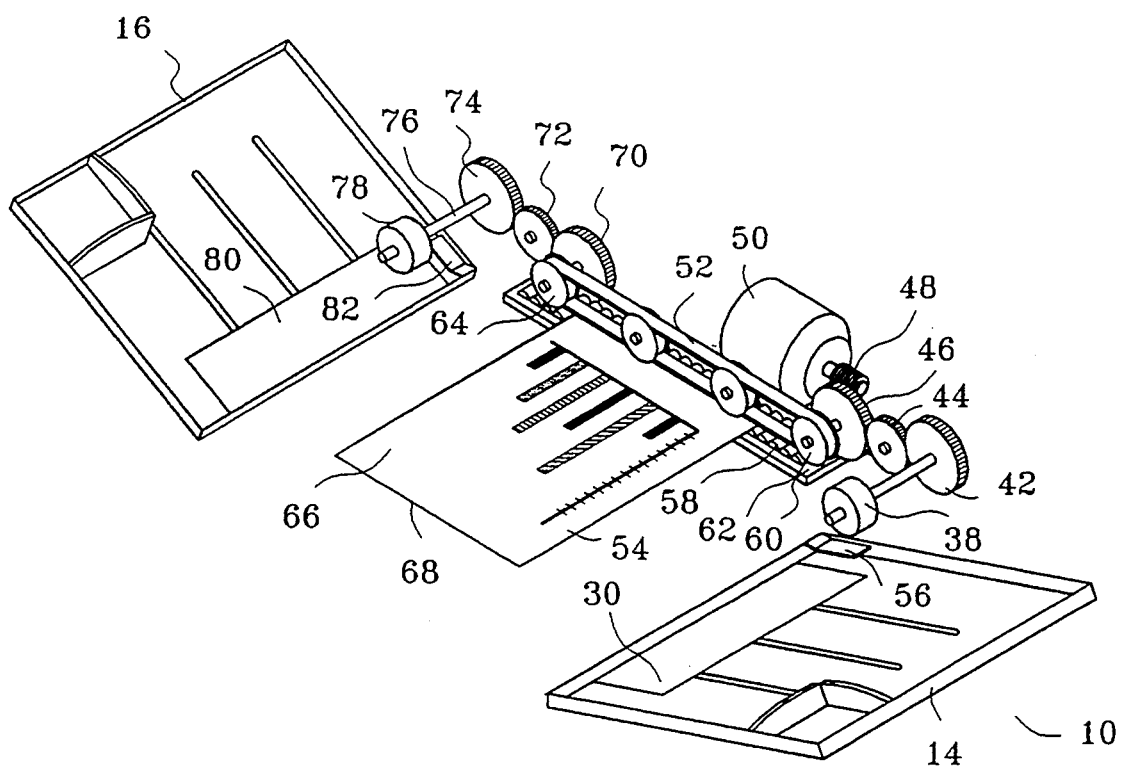
FIG. 2 is an exploded view of a transparency display system in accordance with the teachings of the present invention.

FIG. 2 is an exploded view of the display system 10 of the present invention. The display system 10 includes a first receiving tray 14 and a second receiving tray 16. For the purposes of illustration, the housing 24 has been removed so as to show the interior workings of the staging means 18. The first receiving tray 14 includes the lift plate 30 therein. The lift plate 30 is suitable for supporting a plurality of transparencies thereon. A first feed roller 38 is positioned over the lift plate 30 within the area of the tray 14. The feed roller 38 is a roller which has a rubber surface having a high coefficient of friction. A cantilevered shaft 40 extends from the roller 38 to a drive gear 42. The drive Gear 42 is interconnected by gear 44 to the motor driven Gear 46. The motor driven gear 46 has external teeth that mesh with the gear 48 of motor 50. In FIG. 2, a worm gear 48 is particularly illustrated. However, in the preferred embodiment of the present invention, it is believed that a spur gear 48 can be more effective for the operation of the present invention. As such, the motor 50 is drivingly connected to the roller 38 for the purpose of moving a transparency from the tray 14 toward the transfer belt 52. The "geared" relationship of the roller 38 and the transfer belt 52 facilitates the automatic movement of a transparency from the tray 14 to the staging area 54 by using a single motor 50. The motor 50 is a DC motor which is capable of movement in both directions pursuant to a proper control signal. The receiving tray 14 also includes a guide tab 56 positioned adjacent an upper edge of the tray 14. Guide tab 56 is positioned so as to allow the movement of a single transparency from the stack of transparencies supported on lift plate 30.

Transfer belt 52 is used to move the transparencies across the staging area 54 of the projector 12 by trapping the transparencies between the belt 52 and lower transfer rollers 58. The lower transfer rollers 58 are mounted within the transfer plate 60 so as to press up against the transfer belt 52. This creates a friction point used to facilitate the transfer of transparencies across the stage area 54. The belt 52 is supported at one end by a pulley 62 driven by a shaft connected to gear 46. The other end of the transfer belt 52 is supported by a pulley 64. As can be seen, the transparency 66 is passed to the staging area 54 along an outer edge. As such, the opposite outer edge 68 is free for adjustment or removal by the user of the system 10. The second pulley 64 is connected to drive gears 70, 72, and 74. These drive gears 70, 72 and 74 are intermeshed together. The drive gear 74 is connected by a shaft 76 to another roller 78 associated with the second tray 16. The second tray 16 also includes a lift plate 80 which extends upwardly in juxtaposition with the rubber surface of the roller 78. The second tray 16 also includes a guide tab 82 which facilitates the passing of a single transparency from a stack of transparencies.

Figure 3:
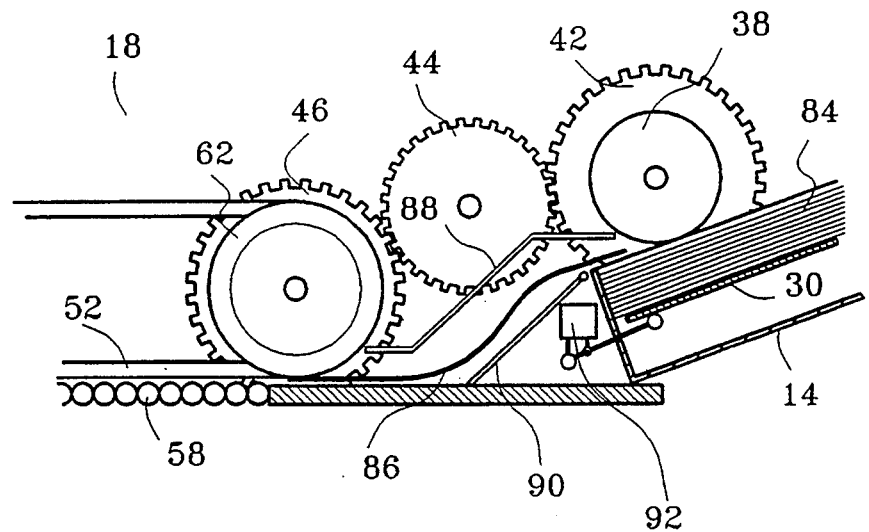
FIG. 3 is a side cross-sectional view of the transparency display system of the present invention.

FIG. 3 illustrates the arrangement of the staging mechanism of the present invention. In particular, in FIG. 3, it can be seen that a stack of transparencies 84 is supported on lift plate 30 within tray 14. The uppermost of the stack of transparencies 84 is in juxtaposition against the rubber surface of the roller 38. When the roller 38 is actuated by the motor 50, the rotation of the roller 38 will draw a single transparency 86 through the guides 88 and 90. The guides 88 and 90 are associated with the staging means 18 and serve to pass the transparency 86 toward the area between the transfer belt 52 and the transfer rollers 58. The roller 38 is connected to the drive gear 42 which, in turn, is connected to another drive gear 44 associated with the driving of the pulley 62. As such, the roller 38 will turn in correspondence with the movement of the pulley 62.

In FIG. 3, it can be seen that a lift servo 92 is provided. This lift servo 92 is connected, at one end, to a surface of the lift plate 30. The lift servo 92 is designed so as to raise and lower the lift plate 30 depending on a desired movement of the transfer belt 52. For example, the lift plate 30 is raised so that the uppermost transparency 86 is juxtaposed against the roller 38 when it is desired to pass a transparency from the stack 84 to the staging means 18. On the other hand, if a transparency passes from the staging means 18 toward the first tray 14, then it will be necessary to lower the lift plate 30 so as to allow the transfer belt 52 and the roller 38 to pass the transparency back onto the stack 84. A similar servo mechanism is also provided with the second tray 16 in a similar manner. As such, the servo mechanism 92 can provide a technique whereby the transparencies can be passed from one tray to the other depending upon the desired order of presentation by the user of the system. It is important to note that, in the preferred embodiment, a lift solenoid is used instead of the lift servo 92.

Figure 4:
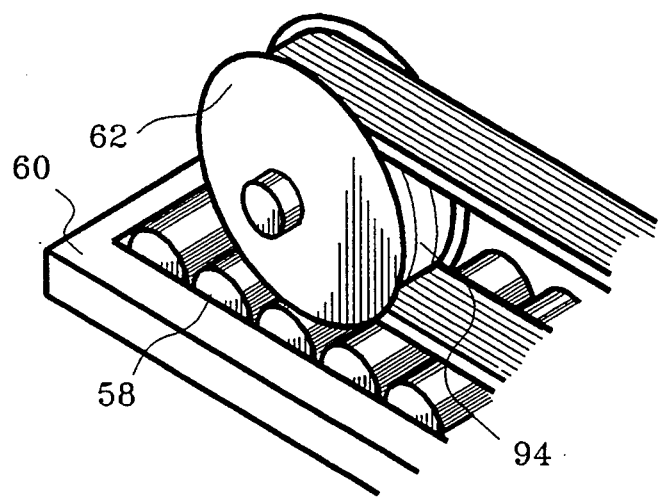
FIG. 4 is a detailed view of the transfer belt and rollers as used in the present invention.

FIG. 4 shows a detailed view of the transfer belt 54 as supported on the pulley 62. The transfer belt 52 will have a relatively high coefficient of friction with a transparency passing between the bottom side of the belt 54 and the top surface of the rollers 58 supported in the roller mount 60. The pulley 62 will have an interior area 94 suitable for receiving the interior surface of the belt 50.

Figure 5:
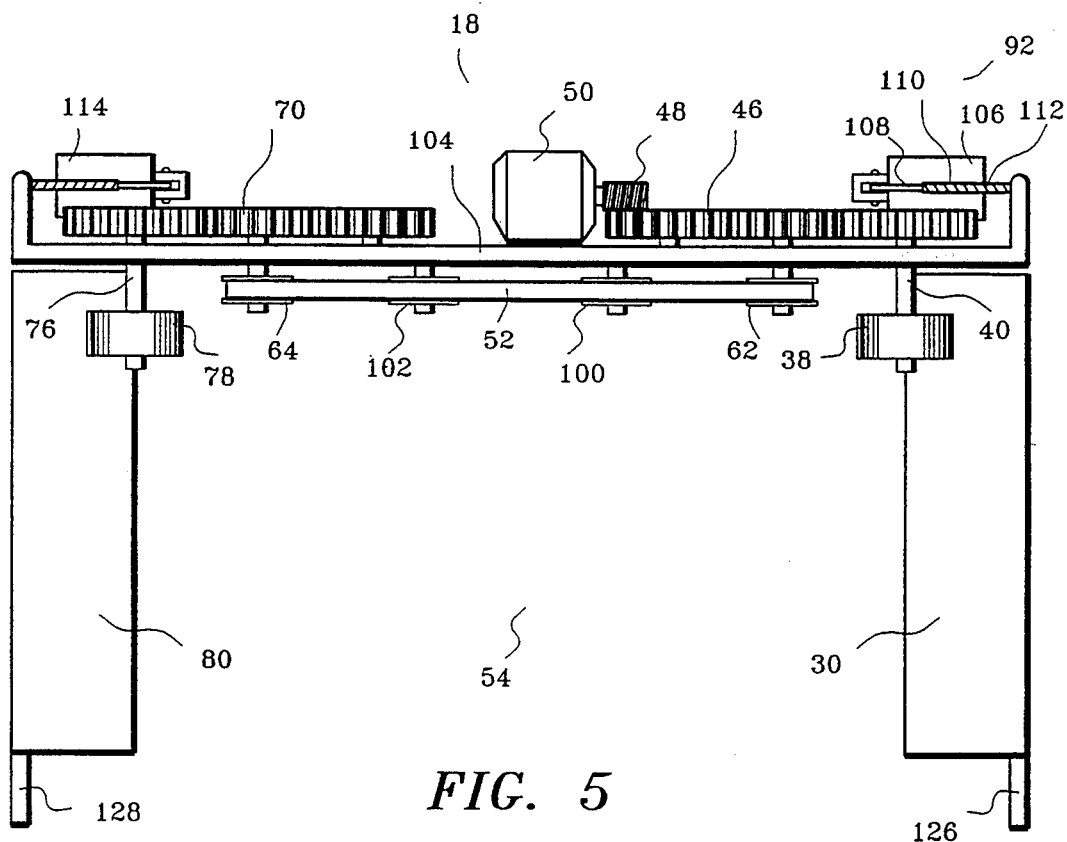
FIG. 5 is a plan view of the interior of the preferred embodiment of the transparency display system of the present invention.

FIG. 5 shows the interior workings of the staging area 18. As can be seen from the arrangement in FIG. 5, the staging area 54 provides a wide viewing area suitable for accommodating the light box of the overhead projector. At one end, the lift plate 30 is positioned below the roller 38. The roller 38 is connected by shaft 40 to the gears associated with the motor 50. The drive pulley 62, along with transfer rollers 100 and 102 and the driven pulley 64, support the transfer belt 52 in a proper position over the edge of the staging area 54. Frame 104 supports these pulleys 100, 102, and 64. At the other end, the driven pulley 64 is connected to a gear 70 which is interconnected to a gear driving the roller 78. The roller 78 is positioned above the lift plate 80 of the second tray 16.

Importantly, in FIG. 5, the solenoid lift mechanism 92 is illustrated in more particular detail. As can be seen, a lift tray solenoid 106 is interconnected to a push rod 108 and to a compression rod 110. Alternatively, it can be a single solid rod. Rod springs 112 extend around the compression rod 110. The compression rod 110 houses a push rod 108 and a spring 112 so as to create a telescopic assembly used to raise the lift plate 30 under a constant force. A similar arrangement is provided with the lift solenoid 114 associated with the second tray 16 and the lift plate 80. When the solenoid 106 is actuated, the lift plate 30 can move upwardly or downwardly depending upon the control signal transferred to the lift solenoid 106.

Figure 6:
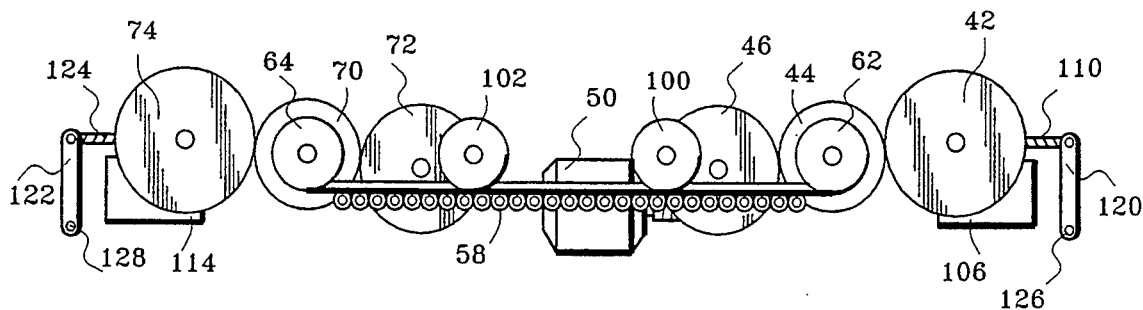
FIG. 6 is a side view in partial cross-section of the transparency display system shown in FIG. 5.

FIG. 6 illustrates the arrangement of the staging area 18. As can be seen, the motor 50 is drivingly connected to the gear 46, and the associated driven pulley 62. Similarly, the gear 46 is drivingly interconnected, by intermediate gear 44, to the gear 42 associated with the roller 38. The upper transfer rollers 100 and 102 are shown and supported above the lower transfer rollers 58. The driven pulley 68, and its associated gear 70 are shown as drivingly interconnected, by intermediate gear 72, to the gear 74 associated with the feed roller 78. The lift tray solenoids 106 and 114 are illustrated at opposite ends of the staging means 18.

In FIG. 6, it can be seen that a rod pivot arm 120 is pivotally connected to an end of the compression rod 100. Generally, a rod pivot arm 122 is connected to an end of the compression rod 124 associated with the lift plate 80 and the solenoid 114. The rod pivot arms 120 and 122 are used to compress the compression rods 110 and 124 to the lift shafts 126 and 128, respectively. As such, these arms 120 and 122, in combination with the compression rods 110 and 124 create a hinge point used for raising the associated lift plates 30 and 80, respectively. The lift shafts 126 and 128 are directly attached to the lift plates 30 and 80, respectively. These lift shafts 126 and 128 are used to raise the lift plates up against the rollers 38 and 78.

Figure 7:
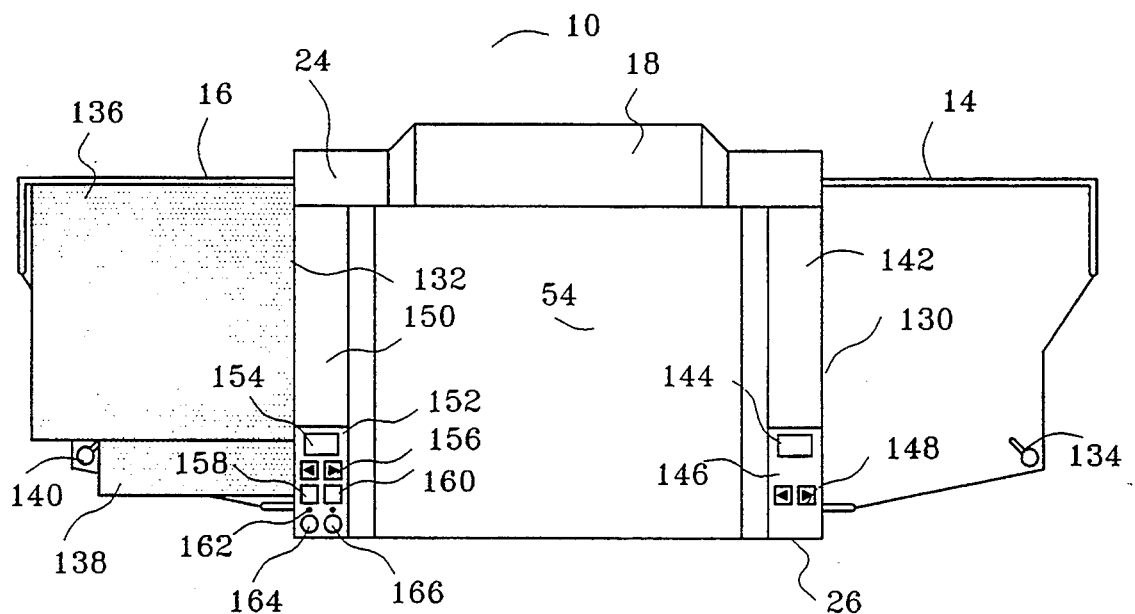
FIG. 7 is a plan view of the preferred embodiment of the transparency display system of the present invention.

FIG. 7 shows a plan view of the transparency display system 10 of the present invention. As can be seen, the first tray 14 is received into a side 130 of the housing 24 of the staging means 18. The second tray 16 is received into the opposite side 132 of the housing 24. The first tray 14 includes a transparency tray guide assembly 134 positioned therein. This transparency tray guide assembly 134 are located within the trays 14 and 16. In FIG. 7, the transparency tray guide assembly 134 is illustrated as located within the first tray 14. The tray Guide assembly 134 is illustrated as located within the first tray 14. The tray guide assembly 134 is connected to a solenoid which, when actuated, indexes the Guide 134 along a linear path. This assembly 134 functions to re-align transparencies within the tray 14 prior to feeding into the stage means 18 and the stage area 54 of the overhead projector. This guide 134 is removable when framed transparencies are used.

The second tray 16 is also illustrated in FIG. 7 as containing portrait transparencies 136 and landscape transparencies 138. As can be seen, the trays 14 and 16 can accommodate both types of transparencies. The second tray 16 also includes another tray Guide assembly 140 interposed at a corner between the portrait transparency 136 and the landscape transparency 138.

In FIG. 7, it can be seen that the housing 24 has a first side 130 that includes a right side console 142. This console 142 includes an alpha-numeric LED 144. A remote control unit 146 is also provided on this right console 142. The remote control unit 146 is shown as capable of bi-directional operation. Buttons 148 are provided on the remote control unit 146 for controlling the movement of a transparency between the trays 14 and 16 and the staging area 54. The left console 150 also includes a control panel 152. Control panel 152 includes a numeric LED 154 which serves as a counter. Buttons 156 control the movement of the transparency to the left or to the right. Button 158 can be used so as to increase the changing speed of the transparencies for more dynamic speakers. Button 160 is provided so as to enable the system to use mounting frames. LED's 162 are provided so as to provide indications to the user of the actuation of buttons 158 and 160. A "clear" button 164 is provided so as to clear the staging area 54 of transparencies. A reset button 166 is also provided so as to reset the counter 154 back to zero.

Figure 8:
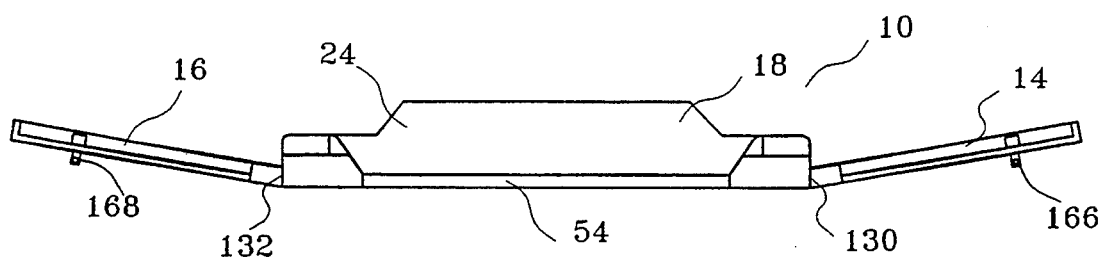
FIG. 8 is a side elevational view of the transparency display system of the present invention.
Figure 9:
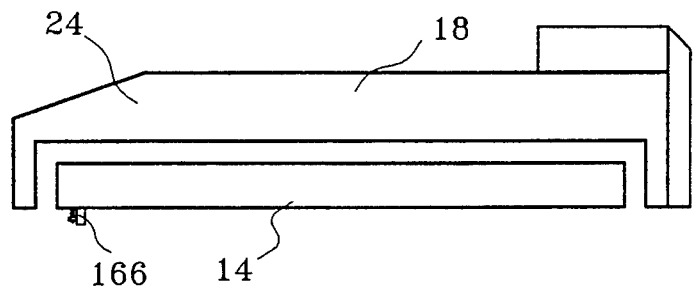
FIG. 9 is an isolated end view showing the transparency receiving tray of the present invention.

FIG. 8 provides a side view of the system 10. In particular, in FIG. 8, it can be seen that the guide solenoids 166 and 168 are shown as connected to the trays 14 and 16, respectively. Similarly, FIG. 9 shows the guide solenoid 166 as affixed to the tray 14. The tray 14 is shown in its orientation with respect to the staging means 18 and the housing 24.

With reference to FIG. 7, it is important to note that the remote control unit 146 can be wireless (or wired) controlled and have directional controls. This remote control unit 146 is mounted to the right side of the unit. Alternatively, the system 10 will be capable of communicating with the remote control unit 146 as far as displaying user/error messages and counting functions on an LED (or LCD). The remote control unit 146 is capable of bi-directionally transferring portrait and landscape transparencies. This also provides the ability to select framed or unframed transparencies. The console and remote control units allow the system to advance to a specific transparency within a stack (through a "seek" function). The controls are capable of having one transparency immediately follow another into the stage area 54. The control buttons 152 have the ability to clear the stage of all transparencies. The displays can be used so as to show user messages. A cooling fan is provided so as to automatically activate at "unsafe" temperatures. The electronics of the control system operate off of a DC power supply.

Figure 10:
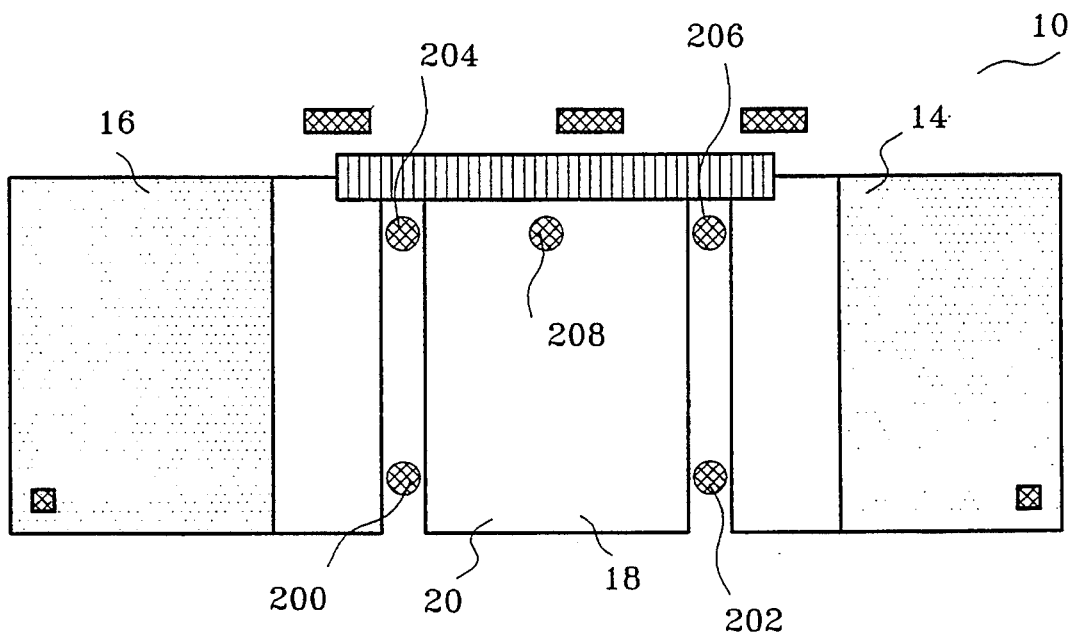
FIG. 10 is a plan view showing the arrangement of sensors employed in the transparency display system of the present invention.
Figure 11:
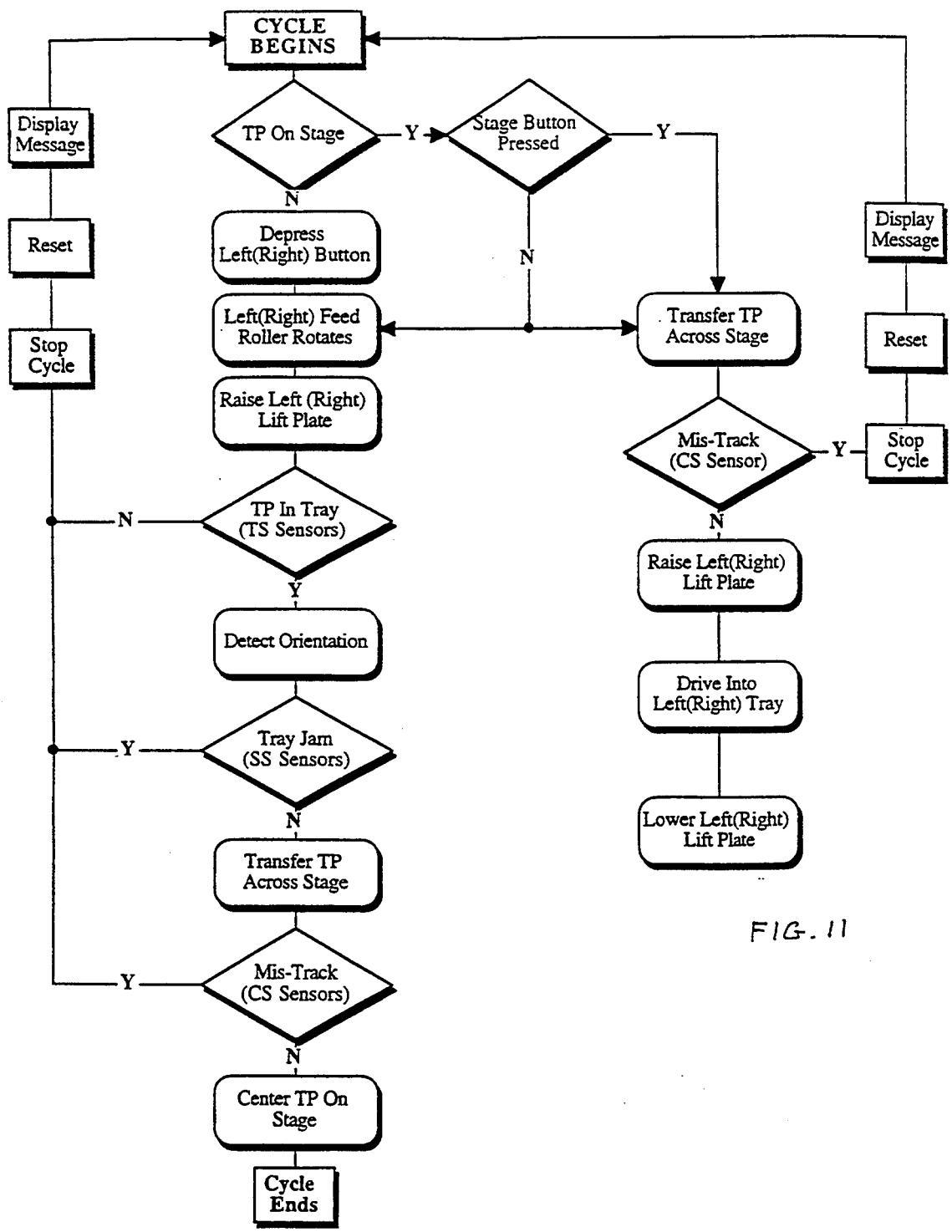
FIG. 11 is a block diagram showing the logic of the controller of the present invention.

FIG. 10 is a diagrammatic view of the sensors which are used within the system 10 of the present invention. Tray sensors 200 and 202 are mounted adjacent to the trays 16 and 14, respectively. Stage sensors 204 and 206 are positioned adjacent to the trays 16 and 14, respectively, and also adjacent an edge of the staging means 18. A centering sensor 208 is positioned centrally of the staging area 20. The tray sensors 200 and 202 are used to determine the presence of a transparency and portrait orientation. These sensors can be either mechanical or optical. The stage sensors 204 and 206 are used to determine the landscape orientation of a transparency by working in conjunction with the tray sensors 200 and 202. The stage sensors 204 and 206 can also be used so as to detect tray jams. The centering sensor 208 is used to register the initial entry of the transparency into the stage and to center it by moving an appropriate distance based upon transparency orientation. It can also be used to register any mis-tracking of the transparency from the stage rollers. The logic of this sensor arrangement, in combination with the controller, is illustrated in block diagram form in FIG. 11. By pushing the button on the console of the system 10, or on the remote control unit 146 when there is no transparency on the stage 54, results in the feed roller rotating via the electric motor 50. Additionally, the lift plate will raise up against the feed roller 38 via an actuating device. The appropriate sensor will detect whether a transparency is present. If a transparency is not present, then the lift plate will lower and an error message, signifying this occurrence, will be displayed. If there is a transparency, then the cycle will continue.

The continuation of the cycle will lead to the uppermost transparency being stripped off of the stack. This is accomplished through the use of the guide tab which creates a frictional difference between the top transparency and the surface below. While the transparency is exiting the tray, the tray sensor determines the portrait or landscape orientation of the transparency. If the tray sensor is activated, then the transparency is assumed to be of portrait orientation. If the tray sensor is not activated, then the transparency is assumed to be in the landscape orientation. If the "framed" button is activated on the console, then the tray sensor is masked and the transparency is assumed to be framed.

When the stage sensor is triggered, after a brief delay, the lift plate will drop away from the feed roller. If the sensor is not activated within a reasonable amount of time, the following actions will take place: (1) the cycle is stopped; (2) the transferring system resets itself; and (3) an error message is displayed signifying a tray jam. If the cycle has not been stopped, then the transparency is moved out of the tray and between the transfer belt and the lower transfer rollers where a nip point is created. This allows the transparency to be trapped and pulled across the stage of the overhead projector. After the transparency enters this nip point, the lift plate is lowered by deenergizing the actuator.

When the transparency is assumed to have triggered the centering sensor, three determinations are made.

The first determination is whether the transparency mistracked somewhere after the stage sensors. If the transparency has not triggered this centering sensor within a reasonable amount of time, then the transparency is assumed to have mistracked and the following occurs: (1) the cycle is stopped; (2) the transferring system resets itself; and (3) an error message is displayed signifying this. If the centering sensor does detect the transparency, then the transparency will be advanced the appropriate distance required to center it on the stage of the overhead projector and the counter display will be adjusted by one and the cycle will have been completed.

At this point, the transparency can be automatically or manually removed from the stage and placed in the left tray. If the user chooses to manually remove the transparency, they need only pick up the front end of the transparency and lightly pull it from under the transfer belt since the force holding the transparency in place is moderate. In order to automatically remove the transparency from the stage, the user would press either the left button or the right button. For example, if the left button is pressed while a transparency is on the stage, the above steps will occur on the right tray and the left tray will perform the functions as follows: (1) the transfer belt will begin rotating in a counterclockwise direction so as to cause the transparency to move toward the left; (2) when the transparency moving from the stage toward the left tray triggers the stage sensor, after a short delay, the left lift plate will raise up against the feed roller and stay up long enough to place the transparency back into the left tray; and (3) when the left lift plate is lowered, the tray guide will index inward against the transparency so as to cause the transparencies in the tray to be realigned. This allows for more accurate re-feeding. These steps are repeated in the same way, but on the opposite tray, when the right button is pressed.

In order to clear the stage of a transparency, the previous steps are repeated. No transparency comes from the trays into the stage in this case. Only the transparency on the stage moves off of the stage and into the tray.

The present invention is an overhead projector presentation system which automates the use of overhead transparencies. Its primary purpose is to reduce the awkwardness associated with transferring and positioning transparencies onto an overhead projector during presentation activity. The present invention enables the presenter to deliver a smoother, more organized and professional presentation. By enabling a presenter to interact more freely with the audience, the present invention improves the presenter's overall effectiveness and persuasiveness. The surface mount feature of the present invention allows it to be adapted to most overhead projectors. Compared to prior systems, the present invention is simpler and more economic to manufacture and is designed to have a higher expected level of reliability. The present invention provides easier access to transparencies. The present invention is more flexible in its use. The compact, low profile, and portable design allows the present invention to be used with more overhead projectors.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A system for the display of transparencies comprising:
   a first transparency receiving tray;
   a second transparency receiving tray;
   a staging means connected at one end to said first transparency receiving tray and at the other end to said second transparency receiving tray, said staging means comprising:
      a transfer belt means extending across said staging means, said transfer belt means for moving a transparency across a staging area of said staging means;
      a motor means drivingly connected to said transfer belt so as to selectively rotate said transfer belt in a desired direction; and
      a guide means positioned adjacent said first transparency receiving tray, said guide means for directing a transparency from said first transparency receiving tray to said transfer belt; and
   control means connected to said motor means, said control means for actuating said motor means for moving a transparency across the staging area in a desired direction, said first transparency receiving tray comprising:
      a first lift plate means positioned thereon, said lift plate means for supporting a plurality of transparencies thereon; and
      a first guide tab means connected to an upper edge of said first transparency receiving tray adjacent said staging means, said first guide tab means for directing a single transparency to said transfer belt means, said first lift plate means for urging said plurality of transparencies toward said first guide tab means.

2. The system of claim 1, said first transparency receiving tray further comprising:
   a first lift solenoid means connected to said lift plate means, said first lift solenoid means being interconnected to said control means, said first lift solenoid means for raising or lowering said lift plate means relative to an action of said control means.

3. The system of claim 1, said staging means further comprising:
   a feed roller means rotatably mounted adjacent said guide tab means of said first transparency receiving tray, said feed roller means drivingly connected to said motor means, said feed roller means for moving a transparency through said guide tab means toward said transfer belt means.

4. The system of claim 3, said feed roller means interconnected to said transfer belt means through a plurality of intermeshed gears, at least one of said gears having external teeth, said motor means having a spur gear thereon, said spur gear meshed with said external teeth, said feed roller means rotating relative to a rotation of said transfer belt.

5. The system of claim 1, said staging means further comprising:
   a plurality of transfer rollers underlying a bottom surface of said transfer belt means, said transfer belt means for passing a single transparency over said plurality of transfer rollers.

6. The system of claim 1, said motor means being a DC motor, said control means being remote from said motor means.

7. The system of claim 2, said second transparency receiving tray further comprising:
- a second lift plate means positioned therein, said second lift plate means for supporting a plurality of transparencies thereon,
- a second guide tab means connected to an upper edge of said second transparency receiving tray adjacent said staging means, said second guide tab means for directing a single transparency to said transfer belt means, said second lift plate means for urging said plurality of transparencies toward said second guide tab means; and
- a second lift solenoid means connected to a surface of said lift plate means, said second lift solenoid means interconnected to said control means, said second lift solenoid means for raising or lowering said second lift plate means relative to an action of said control means.

8. The system of claim 7, said control means for lowering said second lift plate means when said transfer belt means passes a transparency from said staging means toward said second transparency receiving tray.

9. The system of claim 1, each of said first and second transparency receiving trays having a size suitable for receiving landscape and portrait transparencies.

10. The system of claim 1, said staging means comprising:
- a housing extending from an outer edge of said first transparency receiving tray to an outer edge of said second transparency receiving tray, said housing having said motor means and said transfer belt means contained therein.

11. The system of claim 1, said control means comprising:
- a remote controller having control function buttons positioned thereon; and
- a receiver mounted in said staging means.

12. The system of claim 1, said control means comprising:
- a plurality of control buttons mounted on said staging means, said control buttons for actuating said motor means for moving a transparency from one of said first and second transparency receiving trays to the other across said staging area.

13. The system of claim 3, said feed roller means comprising:
- a roller having a rubber surface with a high coefficient of friction, said rubber surface juxtaposed against a surface of a transparency; and
- a gear connected to said roller and drivingly interconnected to said motor means.

14. A system for the display of transparencies comprising:
- a first transparency receiving tray;
- a second transparency receiving tray;
- a staging means connected at one end to said first transparency receiving tray and at the other end to said second transparency receiving tray, said staging means comprising:
  - a transfer belt means extending across said staging means, said transfer belt means for moving a transparency across a staging area of said staging means;
  - a motor means drivingly connected to said transfer belt so as to selectively rotate said transfer belt in a desired direction;
  - a guide means positioned adjacent said first transparency receiving tray, said guide means for directing a transparency from said first transparency receiving tray to said transfer belt; and
  - sensor means mounted adjacent said first and second transparency receiving trays, said sensor means for sensing a transparency in the staging area, said sensor means comprising:
    - a first sensor means positioned adjacent an edge of said first and second transparency receiving trays for detecting a presence of a transparency;
    - a second sensor means positioned at an edge of the staging area for determining an orientation of a transparency entering the staging area; and
    - a third sensor means positioned centrally of said staging area, said third sensor means for sensing the centering of a transparency in the staging area; and
- control means connected to said motor means, said control means for actuating said motor means for moving a transparency across the staging area in a desired direction.

15. The system of claim 14, said first, second, and third sensor means interconnected with said control means.

16. The system of claim 15, said housing having a generally rectangular configuration, said housing having sides hingedly and removably connected to said first and second transparency receiving trays, said housing having an open central area, said open central area for the display of a transparency.

17. A system for the display of transparencies comprising:
- a first transparency receiving tray;
- a second transparency receiving tray;
- a staging means connected at one end to said first transparency receiving tray and at the other end to said second transparency receiving tray, said staging means comprising:
  - a transfer belt means extending across said staging means, said transfer belt means for moving a transparency across a staging area of said staging means;
  - a motor means drivingly connected to said transfer belt so as to selectively rotate said transfer belt in a desired direction; and
  - a guide means positioned adjacent said first transparency receiving tray, said guide means for directing a transparency from said first transparency receiving tray to said transfer belt; and
- control means connected to said motor means, said control means for actuating said motor means for moving a transparency across the staging area in a desired direction, said first transparency receiving tray comprising:
- a portrait transparency receiving area;
- a landscape transparency receiving area; and
- a guide solenoid means interactive with said portrait transparency receiving area and said landscape transparency receiving area, said guide solenoid means for selectively controlling a movement of said areas relative to a signal of said control means.

* * * * *